United States Patent
Haas

(10) Patent No.: US 9,402,446 B2
(45) Date of Patent: Aug. 2, 2016

(54) BELT BUCKLE WITH RELEASE LOCK

(71) Applicant: TRW Automotive GmbH, Alfdorf (DE)

(72) Inventor: Peter Haas, Eschach (DE)

(73) Assignee: TRW Automotive GmbH (DE)

( * ) Notice: Subject to any disclaimer, the term of this patent is extended or adjusted under 35 U.S.C. 154(b) by 181 days.

(21) Appl. No.: 14/377,219

(22) PCT Filed: Feb. 5, 2013

(86) PCT No.: PCT/EP2013/000340
§ 371 (c)(1),
(2) Date: Aug. 7, 2014

(87) PCT Pub. No.: WO2013/117317
PCT Pub. Date: Aug. 15, 2013

(65) Prior Publication Data
US 2016/0007691 A1    Jan. 14, 2016

(30) Foreign Application Priority Data

Feb. 7, 2012  (DE) .......................... 10 2012 002 207
Sep. 13, 2012 (DE) .......................... 10 2012 018 070

(51) Int. Cl.
*A44B 11/25*    (2006.01)
*B60R 99/00*    (2009.01)

(52) U.S. Cl.
CPC ......... *A44B 11/2569* (2013.01); *A44B 11/2515* (2013.01); *A44B 11/2523* (2013.01); *B60R 99/00* (2013.01); *Y10T 24/45623* (2015.01); *Y10T 24/45639* (2015.01); *Y10T 24/45681* (2015.01)

(58) Field of Classification Search
CPC .. A44B 1/2523; A44B 1/2569; A44B 1/2515; Y10T 24/45623; Y10T 24/45639; Y10T 24/45681; B60R 99/10
See application file for complete search history.

(56) References Cited

U.S. PATENT DOCUMENTS

| | | | |
|---|---|---|---|
| 5,595,400 A | 1/1997 | Wier | |
| 5,765,266 A | 6/1998 | Betz | |
| 5,915,633 A * | 6/1999 | Biller | A44B 11/2523 24/637 |
| 5,996,193 A * | 12/1999 | Gill | A44B 11/2523 24/633 |
| 6,205,628 B1 | 3/2001 | Downie | |

(Continued)

FOREIGN PATENT DOCUMENTS

| | | |
|---|---|---|
| EP | 0557983 | 9/1993 |
| EP | 0823223 | 2/1998 |

*Primary Examiner* — Robert J Sandy
(74) *Attorney, Agent, or Firm* — Tarolli, Sundheim, Covell & Tummino LLP

(57) ABSTRACT

A belt buckle (10) for a seat belt includes a buckle housing (16), a locking mechanism for locking a plug-in tongue inserted in the buckle housing (16), a release button (22) which is movable in a first direction relative to the buckle housing (16) for unlocking the plug-in tongue, and a safety mechanism for preventing automatic displacement of the release button (22) in the first direction. The safety mechanism includes a mass body (36) movable in the first direction relative to the buckle housing (16) and a movably supported coupling lever (24) including an axis of rotation which is stationary relative to the buckle housing (16). The coupling lever (24) is coupled to the mass body (36) and to the release button (22) so that, upon acceleration of the belt buckle (10) in a second direction opposed to the first direction, it transmits an inertia force acting on the mass body (36) in the first direction to the release button (22) in the opposite second direction.

11 Claims, 7 Drawing Sheets

(56) References Cited

U.S. PATENT DOCUMENTS

| | | | | |
|---|---|---|---|---|
| 6,233,794 B1 * | 5/2001 | Kohlndorfer | ...... | A44B 11/2523 24/633 |
| 6,367,129 B1 * | 4/2002 | Mori | ...... | A44B 11/2523 24/171 |
| 6,438,810 B2 * | 8/2002 | Rogers, Jr. | ...... | A44B 11/2523 24/633 |
| 6,463,639 B1 * | 10/2002 | Mori | ...... | A44B 11/2523 24/629 |
| 7,124,480 B2 * | 10/2006 | Kawai | ...... | A44B 11/2523 24/633 |
| 8,429,799 B2 * | 4/2013 | Ng | ...... | A44B 11/2523 24/633 |
| 2008/0127466 A1 | 6/2008 | Duteil | | |
| 2011/0185546 A1 | 8/2011 | Neumann et al. | | |

* cited by examiner

B ←——→ A

B ←→ A

B ← → A

B ←→ A

B ← → A

B ←→ A

BELT BUCKLE WITH RELEASE LOCK

RELATED APPLICATIONS

This application corresponds to PCT/EP2013/000340, filed Feb. 5, 2013, which claims the benefit of German Application Nos. 10 2012 002 207.7, filed Feb. 7, 2012 and 10 2012 018 070.5, filed Sep. 13, 2012, the subject matter, of which are incorporated herein by reference in their entirety.

BACKGROUND OF THE INVENTION

The invention relates to a belt buckle for a seat belt.

Especially in the case of belt buckles coupled to a belt tensioner, there is the risk of the belt buckle opening automatically due to the high acceleration at the beginning or at the end of belt tensioning, if great inertia forces act on the components of the belt buckle. Release locks that are intended to prevent the belt buckle from opening inadvertently are known in different designs.

EP 0 557 983 A1 illustrates a seat belt buckle comprising a latch lock in which in the case of great mass forces a latch pin serving as locking element is safely retained in a locking position in that its trajectory is blocked in a gate by a latch element. The latch element is a swivel body rotatably supported on the housing of the belt buckle which is movable with a free first arm into a locking position in which it secures the latch pin against movement out of the locking position. The swivel body includes a bent second arm for actuating and pivoting the swivel body by the release button of the belt buckle into a position releasing the latch pin. The second arm is connected to the release button at its free end via a crank mechanism.

From EP 0 823 223 A2 a belt buckle comprising the features of the preamble of claim 1 is known. In said belt buckle a multi-arm latch lever pivoted about a rotational axis on the housing of the belt buckle for preventing automatic displacement of the release button is provided. A first arm of the latch lever is articulated to the release button, while a swivel body is movably supported on a second arm so that upon abrupt change of speed in one direction of movement it transmits an inertia force to the second arm, wherein in the opposite direction the force transmission from the swivel body to the latch lever is interrupted by a movement relative to the second arm.

SUMMARY OF THE INVENTION

It is the object of the invention to provide a belt buckle having a safety mechanism that is easy to integrate for preventing the belt buckle from automatically opening which works reliably and can be inexpensively manufactured.

This object is achieved by a belt buckle comprising the features of claim 1. Advantageous and useful configurations of the belt buckle according to the invention are described in the subclaims.

The belt buckle according to the invention for a seat belt comprises a buckle housing, a locking mechanism for locking a plug-in tongue inserted in the buckle housing, a release button movable in a first direction relative to the buckle housing for unlocking the plug-in tongue and a safety mechanism to prevent automatic displacement of the release button in the first direction. In accordance with the invention, the safety mechanism includes a mass body movable in the first direction relative to the buckle housing and a rotatably supported coupling lever including an axis of rotation which is stationary relative to the buckle housing. The coupling lever is coupled to the mass body and to the release button so that upon acceleration of the belt buckle in a second direction opposed to the first direction it transmits an inertia force acting on the mass body in the first direction to the release button in the opposed second direction.

The invention is based on the finding that inadvertent opening of a belt buckle can be prevented in that, upon occurrence of high acceleration of an inertia force acting on the release button in the actuating direction (first direction), a counter-force is automatically applied. According to the invention, the mass body and the coupling lever are provided for this purpose. The rotatable but not displaceable coupling lever ensures that the inertia force acting on the mass body is transmitted to the release button in the inverse direction. In this way the release button can be prevented from performing undesired displacement in the actuating direction. The safety mechanism according to the invention requires only few simple components so that a largely easy integration in a belt buckle without excessive extra costs is possible.

In accordance with the invention, by a buckle housing also a frame or any other load-bearing structure can be understood. Furthermore, the term release button is intended to include possible components fixedly connected thereto.

Especially efficient is the safety mechanism according to the invention in a configuration in which the mass of the mass body is greater than the mass of the release button. In this case, with equal acceleration the deflected inertia force acting on the mass body is greater than the inertia force acting on the release button in the actuating direction. Hence for preventing displacement of the release button it is not mandatory to couple a further mass to the mass body or to provide supplementary measures.

For reversing the direction of the inertia force acting on the mass body, according to a preferred embodiment of the invention the coupling lever includes two free arms extending from the axis of rotation, wherein a first free arm acts on the release button and a second free arm acts on the mass body. The coupling lever in this case acts like a rocker outputting a pulse incoming on the side of the mass body to the side of the release button in the opposite direction.

The safety mechanism is supposed not to impair the normal use of the belt buckle, as a matter of course. In order to ensure unhindered pressing of the release button in the actuating direction under normal conditions with the plug-in tongue of the seat belt being inserted, it is preferably provided that in the normal state of the belt buckle in which the release button is located relative to the buckle housing in a position extended in the second direction, the first free arm is adjacent to the release button, especially a step, in the second direction and is deflectable by displacing the release button in the first direction. Since under normal circumstances no significant inertia force acts on the mass body, the latter exerts no counter-force on the release button so that unhindered displacement of the release button in the actuating direction is allowed due to the deflecting capability of the coupling lever. This is not applicable, however, when—as afore-described—the belt buckle is strongly accelerated against the actuating direction, as then the counter-force of the mass body is transmitted to the release button via the coupling lever.

In order to ensure largely resistance-free deflection of the coupling lever while the release button is normally actuated, a design that enables the second free arm to slide onto the step of the release button upon deflection of the coupling lever is of advantage.

It is reasonable to delimit the displacement of the mass body in the first direction. This can be achieved by a stop fixed to the buckle housing which is preferably located in the trajectory of a counter-stop of the mass body. By a "stop fixed to the buckle housing" a stop is to be understood which is formed either directly on the housing or is stationary relative to the housing.

What is even more important is, upon acceleration of the belt buckle in the first direction, to delimit displacement of the mass body in the second direction caused by the inertia force acting on the mass body in the second direction so that the mass body can fulfil its function without being impaired in the case of abrupt reversal of acceleration. For this, a latch mechanism is provided according to a further development of the invention.

In the preferred embodiment of the latch mechanism the latter includes a swivel body that is pivoted about an axis of rotation at the mass body and has a center of gravity which is eccentric relative to its axis of rotation. The inertia force acting on the swivel body when the latter is accelerated generates a torque which results in deflection of the swivel body. This automatic deflection of the swivel body can be advantageously used to lock the mass body.

The locking of the mass body can be achieved in particular by a design in which an inertia force acting on the swivel body in the second direction causes a deflection of the swivel body by which a retaining portion of the swivel body engages in a holding portion fixed to the buckle housing.

Since the pivot body is supported on the mass body, in the case of high acceleration of the belt buckle against the actuating direction, apart from the mass of the mass body also the mass of the swivel body contributes to generating the counterforce that counteracts a displacement of the release button in the actuating direction. Thus it is sufficient in this case, when the sum of the masses of the mass body and of the swivel body is larger than the mass of the release button.

An alternative embodiment of the belt buckle according to the invention can do without a swivel body, which allows for a considerable reduction of the construction length of the belt buckle. In the alternative embodiment the latch mechanism is designed so that a movement of the mass body in the second direction causes a rotation of the coupling lever which is delimited by a holding portion fixed to the buckle housing, in this case at the detent cam guide. By delimiting the rotation of the coupling lever a further movement of the mass body in the second direction is suppressed. Thus, despite the reduced overall length it is ensured also in this embodiment that upon acceleration of the belt buckle in the first direction a displacement of the mass body in the second direction is reliably delimited so that upon abrupt reversal of acceleration the mass body is immediately available at the right position again.

BRIEF DESCRIPTION OF THE DRAWINGS

Further features and advantages of the invention are evident from the following description and from the enclosed drawings which are referred to and in which.

DESCRIPTION OF EMBODIMENTS

Figure 1:
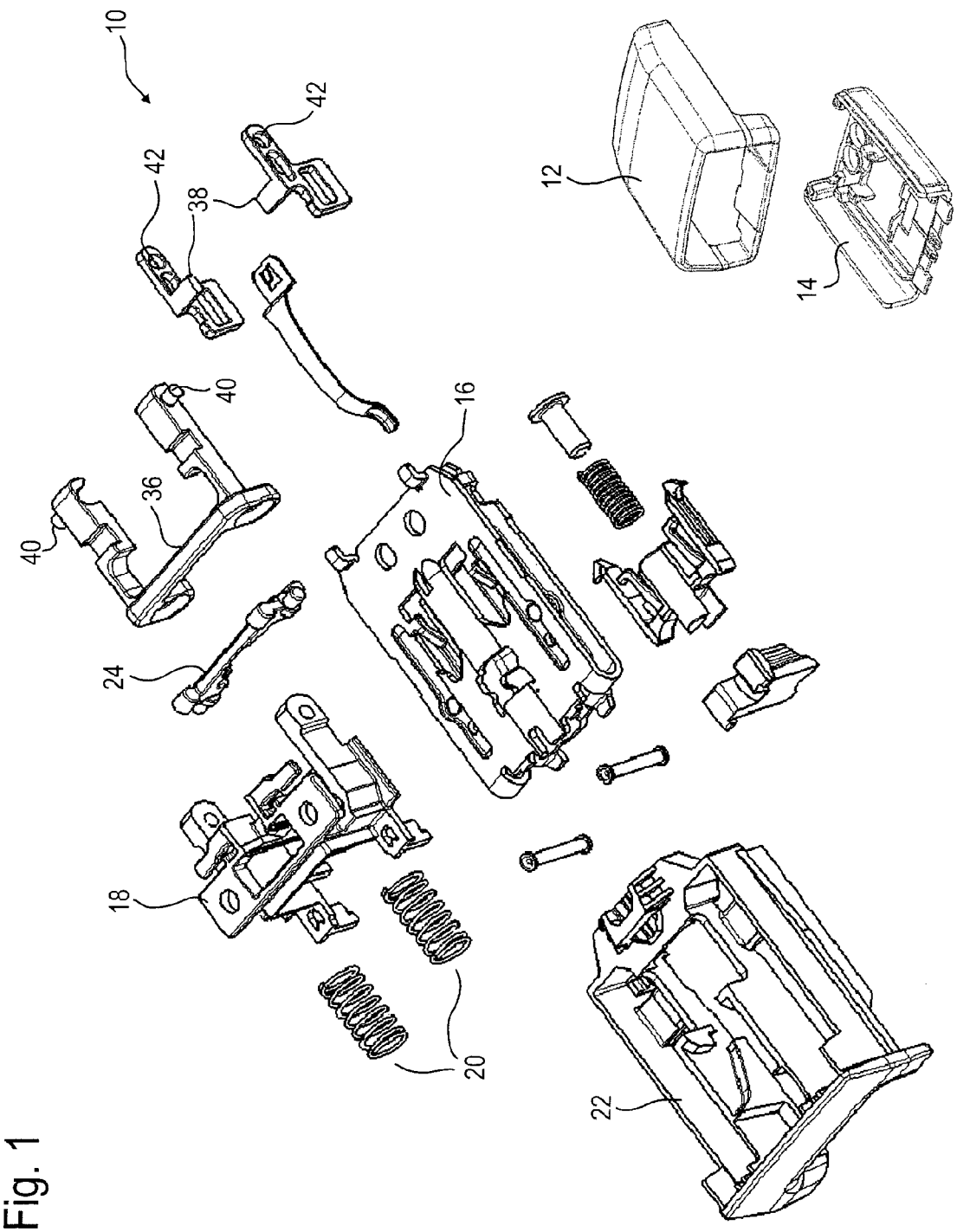
FIG. 1 shows an exploded view of a belt buckle according to the invention in accordance with a first embodiment.
Figure 2:
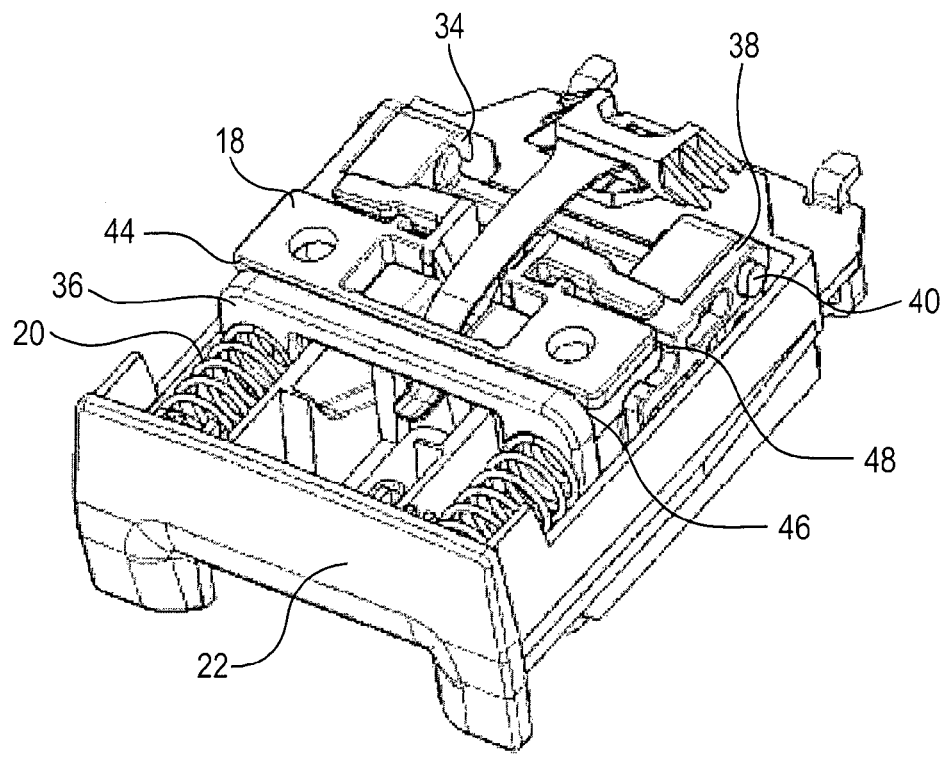
FIG. 2 shows a perspective view of the belt buckle of FIG. 1 in the normal state.
Figure 3:
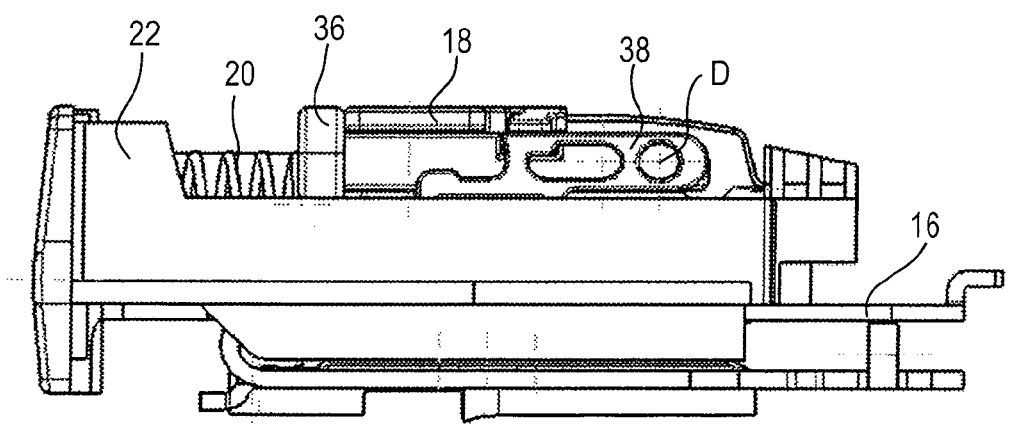
FIG. 3 shows a side view of the belt buckle of FIG. 1 in the normal state.

In FIGS. 1 to 11 a belt buckle 10 for a seat belt system according to a first embodiment is represented which is mounted tightly on the vehicle at a fitting, which is not shown, either directly or by a belt tensioner connected to the fitting. The housing shells 12, 14 are omitted in the FIGS. 2 to 11 so as to allow an unhindered view onto the inner components of the belt buckle 10. Hereinafter, among the components shown in FIG. 1 only the components relevant to the invention shall be discussed, as the basic structure and the basic functioning of a belt buckle 10 are provided as being known.

A detent cam guide 18 is fixedly mounted on a load-bearing buckle housing 16. Two compression springs 20 pretension a release button 22 configured in the form of a slide and being movable relative to the housing in the directions A and B in the direction (second direction) B opposite to the actuating direction (first direction) A.

A two-armed coupling lever 24 is rotatably supported on the detent cam guide 18 via laterally protruding pins 26. In the normal state of the belt buckle 10 a first free arm 28 of the coupling lever 24 is adjacent in the direction B to a step 32 of the release button 22, but is not fixedly connected to the latter. A second free arm 30 of the coupling lever 24 extending oppositely to the first free arm 28 protrudes into an acceptance 34 of a mass body 36 movable in the directions A and B. The acceptance 34 and the second free arm 30 are matched to each other so that the second free arm 30 has a certain mobility relative to the acceptance 34, but that also in the case of movement of the mass body 36 in the direction A or B a permanent coupling between the mass body 36 and the coupling lever 24 is given.

Moreover, the belt buckle 10 further comprises a swivel body 38 which is pivoted on the mass body 36. For this purpose, the mass body 36 at one end includes laterally outwardly protruding bearing pins 40 into which the swivel body 38 provided with corresponding bearing openings 42 is hooked. The pivot body 38 has a center of gravity eccentric with respect to its axis of rotation D. More exactly speaking, the center of gravity of the swivel body 38 is located offset in the direction B and—according to the representation in FIGS. 3 and 4—below the axis of rotation D.

The mass of the release button 22 (including possible components fixedly attached thereto) is smaller than the sum of the masses of the mass body 36 and the swivel body 38 rotatably coupled to the latter. This also includes embodiments in which solely the mass body 36 or the swivel body 38 has a larger mass than the release button 22.

In the normal state of the belt buckle 10 shown in the FIGS. 2 to 5 the release button 22 is not pressed and is provided relative to the buckle housing 16 in a position extended in the direction B. By pressing the release button 22 in the direction A against the biasing force of the compression springs 20 a plug-in tongue of a seat belt (not shown) inserted in the belt buckle 10 and locked by a locking mechanism, here a detent cam mechanism, can be unlocked. The locking mechanism is not discussed in detail, as the concrete configuration thereof is not relevant to the invention.

Figure 6:
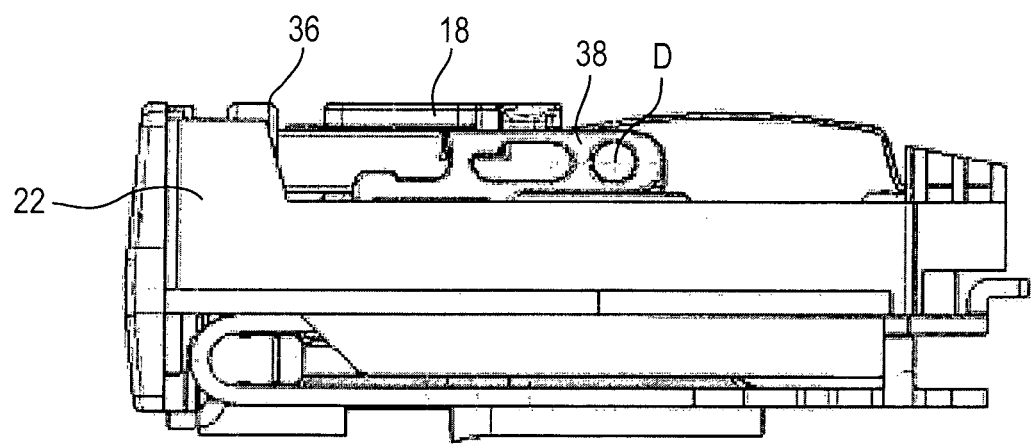
FIG. 6 shows a side view of the belt buckle of FIG. 1 when the release button is pressed.
Figure 7:
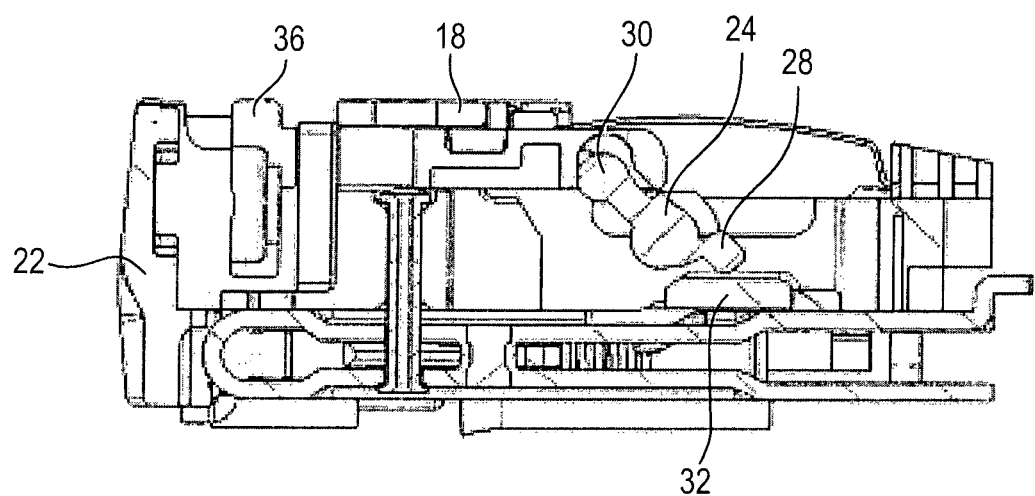
FIG. 7 shows a sectional side view of the belt buckle of FIG. 1 when the release button is pressed.
Figure 8:
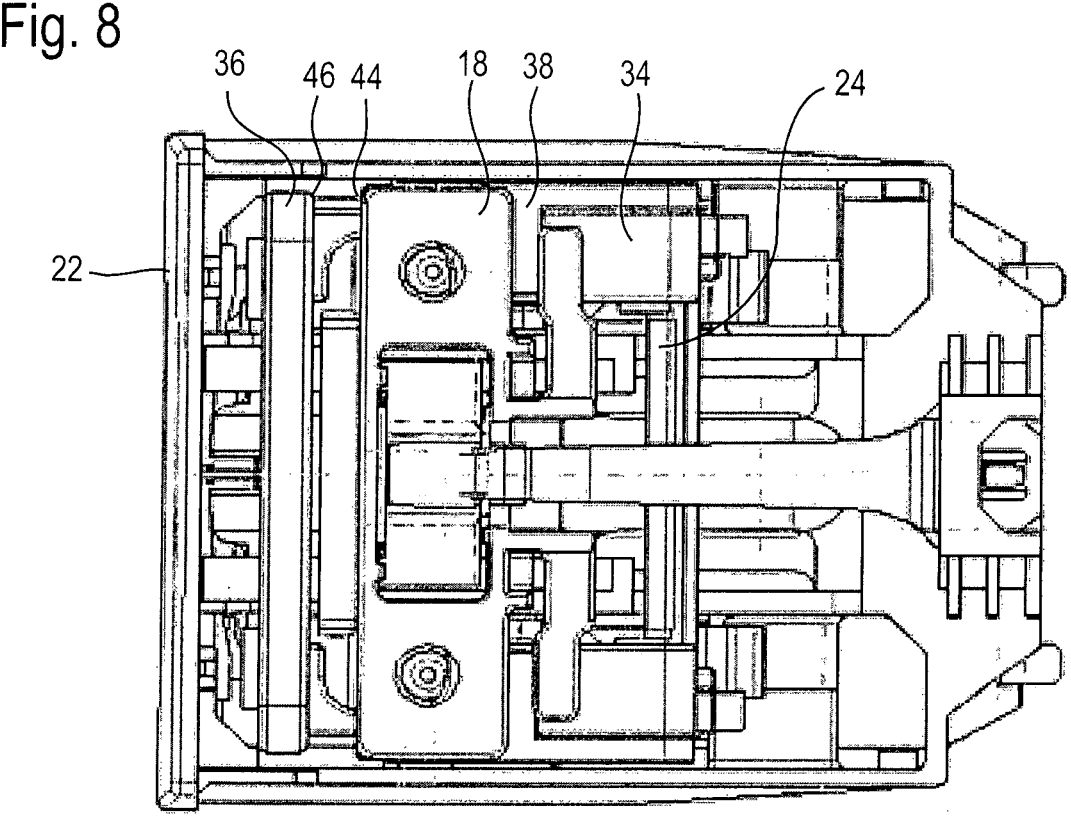
FIG. 8 shows a side view of the belt buckle of FIG. 1 rotated about 90° vis-à-vis the views of the FIGS. 6 and 7 when the release button is pressed.

The state of the belt buckle 10 with the release button 22 being pressed is shown in FIGS. 6 to 8. The release button 22 is displaced relative to the buckle housing 16 in the direction A. As long as in the direction A no significant force acts on the mass body 36 or the swivel body 38, the movement of the release button 22 in the direction A is not hindered by the two bodies 36, 38, as the coupling lever 24 is allowed to perform a rotational motion in which the first free arm 28 slides onto the step 32 of the release button 22 and comes to rest on the same, as is evident from FIG. 7. The second free arm 30 of the coupling lever 24 pushes the mass body 36 and the pivot body 38 in the direction B, which has no effect on the actuation of the release button 22, however. Inversely, also the movement of the release button 22 has no further influence on the mass body 36 or the pivot body 38, as no further coupling to said bodies 36, 38 is provided.

Starting from the normal state of the belt buckle 10 including inserted plug-in tongue and non-pressed release button 22, now the case of a high acceleration of the belt buckle 10 in the direction B shall be taken into consideration, as it may occur especially when decelerating the belt buckle 10 at the end of a belt tensioning operation or due to a hard impact onto the vehicle bottom which is transferred to the belt buckle 10. In this case, inertia forces act on all components of the belt buckle 10 in the direction A. A movement of the release button 22 in this direction which might result in an unlocking of the plug-in tongue is suppressed, however, as shall be explained hereinafter.

The inertia force acting on the mass body 36 and the pivot body 38 coupled to the latter is transferred to the second free arm 30 of the coupling lever 24. Since the coupling lever 24 is rotatably supported on the detent cam guide 18 fixed to the buckle housing by the pins 26, via the second free arm 30 of the coupling lever 24 a force directed oppositely to the direction A is exerted on the step 32 and thus on the release button 22, as is resulting most clearly from FIG. 4. Since the mass body 36 and the pivot body 38 together are heavier than the release button 22, this force acting on the release button 22 in the direction B is greater than the inertia force acting in the direction A. Thus the belt buckle 10 is safely retained in the locked state.

The movement of the mass body 36 in the direction A is delimited by a stop 44 of the detent cam guide 18 which is located in the trajectory of a counter-stop 46 of the mass body 36.

Figure 9:
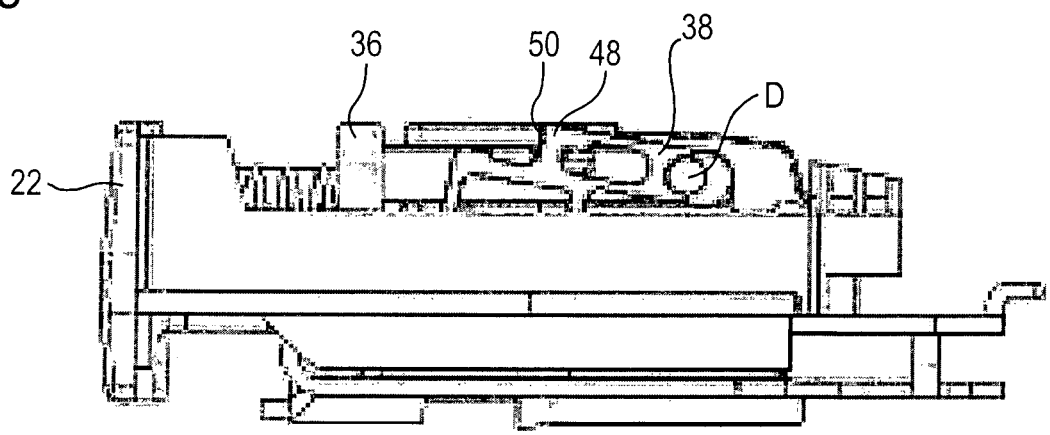
FIG. 9 shows a side view of the belt buckle of FIG. 1 upon acceleration in a first direction.
Figure 10:
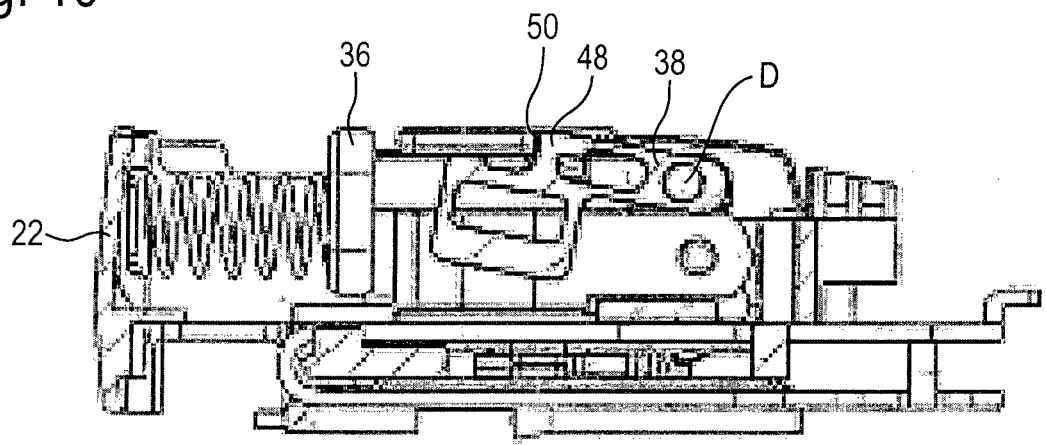
FIG. 10 shows a sectional side view of the belt buckle of FIG. 1 upon acceleration in the first direction.
Figure 11:
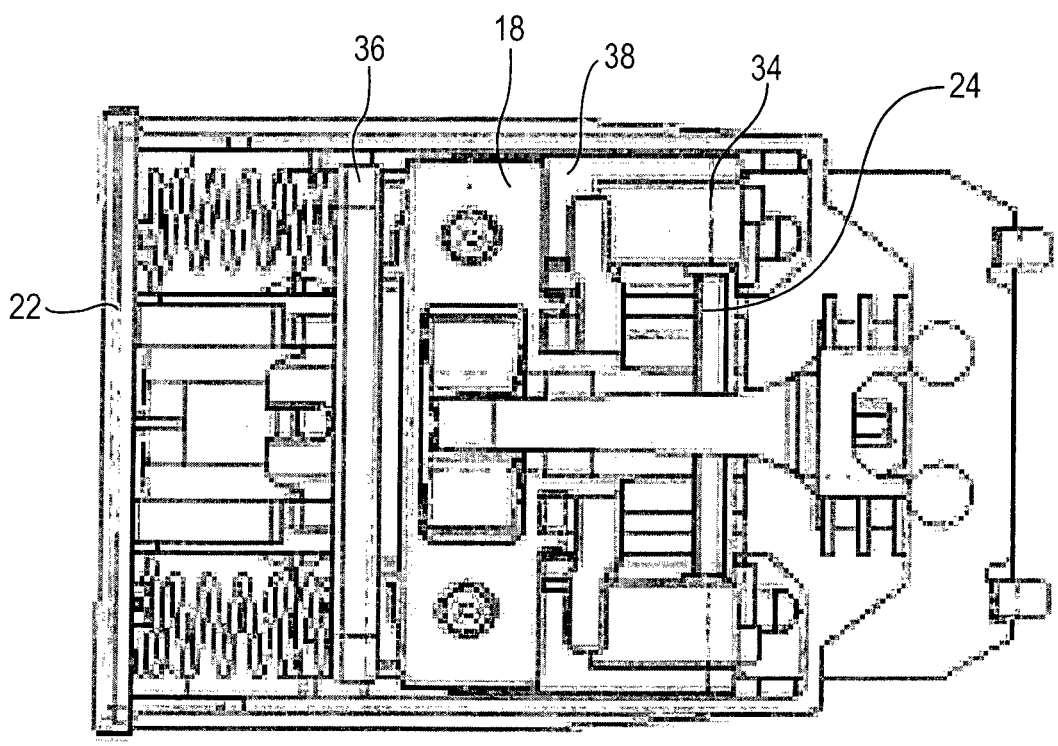
FIG. 11 shows a side view of the belt buckle of FIG. 1 rotated about 90° vis-à-vis the views of the FIGS. 9 and 10 upon acceleration in the first direction.

The FIGS. 9 to 11 illustrate the belt buckle 10 during high acceleration in the direction A, as it may occur especially at the beginning of a belt tensioning process. In this case, no force counteracts the inertia force acting on the release button 22 in the direction B. The inertia forces acting on the mass body 36 and the pivot body 38 cannot be transmitted via the coupling lever 24 in the direction A to the release button 22, as the coupling lever 24 is not connected to the step 32 and thus removes itself from the step 32.

Due to the center of gravity of the pivot body 38 eccentric with respect to its axis of rotation D, the inertia force acting in the direction B generates a torque so that the pivot body 38 performs a rotary motion about its axis of rotation D, clockwise according to the representation in FIGS. 9 and 10. In this way a retaining portion 48 of the pivot body 38 engages in a holding portion 50 of the detent cam guide 18. Since the detent cam guide 18 is stationary relative to the buckle housing 16, a further movement of the pivot body 38 and of the mass body 36 in the direction B is thus suppressed. In this way, the mass body 36 is secured during strong acceleration in the direction A and is maintained in position.

Figure 12:
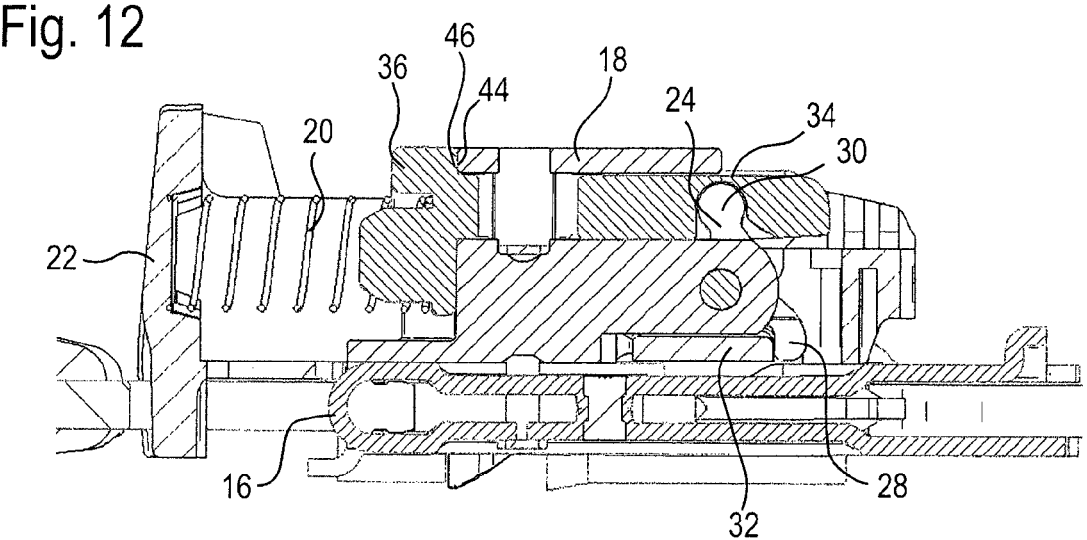
FIG. 12 shows a sectional side view of a belt buckle according to the invention in accordance with a second embodiment in the normal state.
Figure 13:
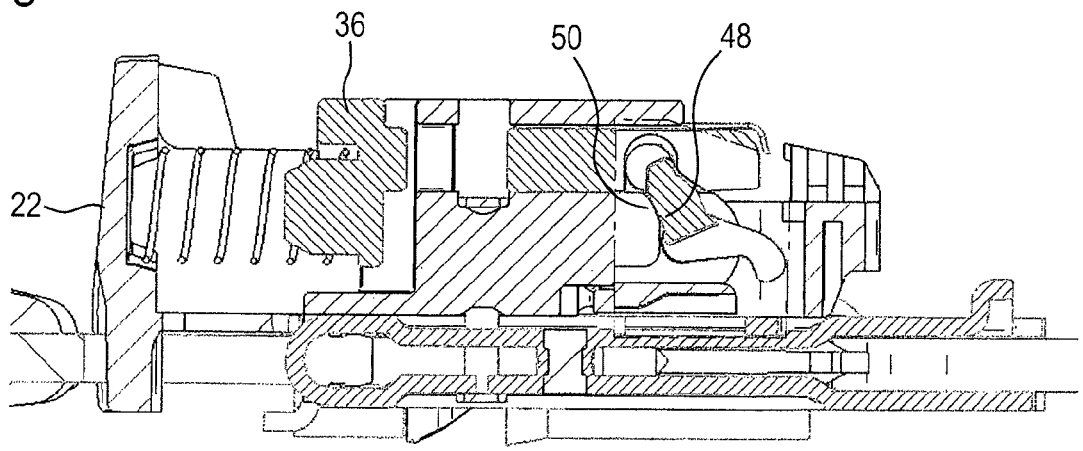
FIG. 13 shows a sectional side view of the belt buckle of FIG. 12 upon acceleration in the first direction.

In FIGS. 12 and 13 a belt buckle for a seat belt system according to a second embodiment is illustrated that exhibits a structure similar to the afore-described belt buckle 10 shown in FIGS. 1 to 11. Therefore, the same reference numerals have been used for corresponding components having the same function despite certain deviations in the concrete configuration, and in this respect the foregoing explanations concerning said components are referred to.

The substantial difference between the two embodiments consists in the fact that the belt buckle according to the second embodiment has a shorter overall length, because no pivot bodies 38 are provided. However, the retaining portion 48 is formed at the coupling lever 24 which is cranked. Accordingly, the holding portion 50 of the detent cam guide 18 fixed to the housing is arranged in a position opposite to the retaining portion 48. The interaction of the retaining portion 48 with the holding portion 50 shall be described in detail later.

Figure 4:
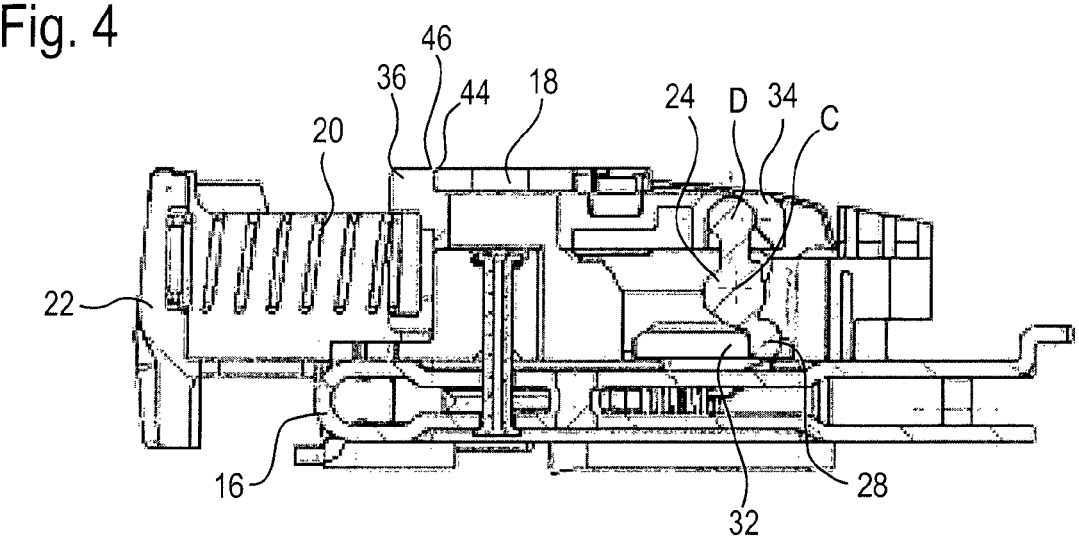
FIG. 4 shows a sectional side view of the belt buckle of FIG. 1 in the normal state.
Figure 5:
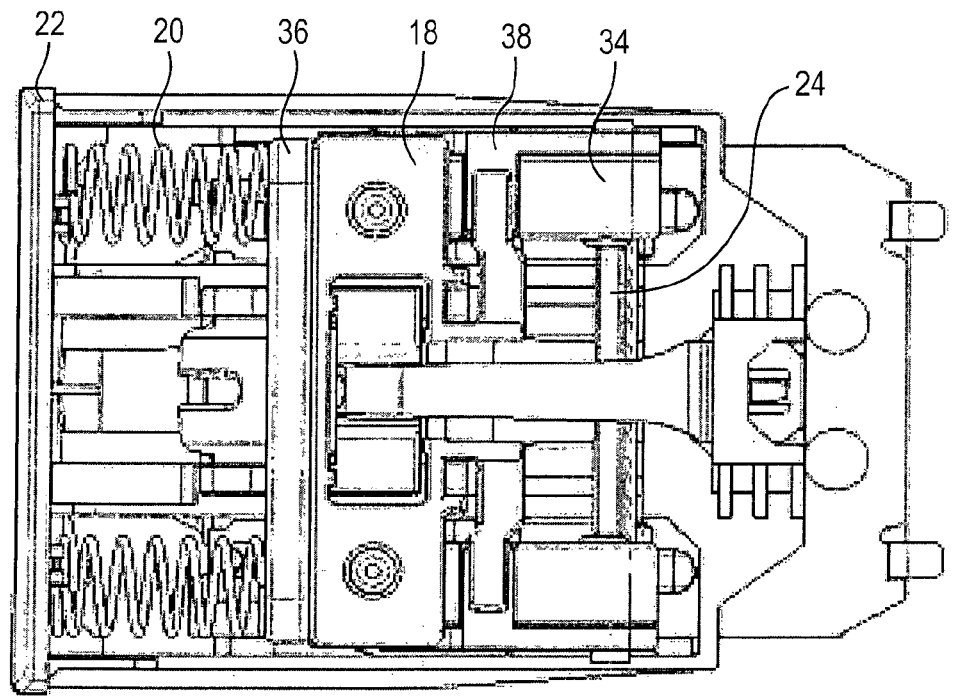
FIG. 5 shows a side view of the belt buckle of FIG. 1 rotated about 90° vis-à-vis the view of FIGS. 3 and 4 in the normal state.

FIG. 12 shows the belt buckle of the second embodiment first in a representation corresponding to FIG. 4 in the normal state, i.e. the release button 22 is not pressed. In the case of high acceleration of the belt buckle in the direction B a movement of the release button 22 in the direction A which might entail unlocking of an inserted plug-in tongue is suppressed in the same way as in the first embodiment. The inertia force in the direction A acting on the mass body 36 experiences a reversal of direction due to the rotatably supported coupling lever 24 and is transmitted in the direction B to the step 32 and thus to the release button 22. Since the mass body 36 is heavier than the release button 22, the force transmitted in the direction B to the release button 22 is greater than the inertia force acting on the release button 22 in the direction A so that the release button 22 remains safely in the locked state. The stop 44 in this situation in turn delimits the movement of the mass body 36 in the direction A.

In FIG. 13 the belt buckle is shown during high acceleration in the direction A. In this case no force counteracts the inertia force acting in the direction B on the release button 22, as the inertia force acting on the mass body 36 is not deflected in the direction A via the coupling lever 24 decoupled from the step 32.

A further movement of the mass body 36 in the direction B which might be transferred to the release button 22 is suppressed in this embodiment by the fact that the coupling lever 24 maintains the mass body 36 in position. Due to the inertia force acting on the mass body 36 in the direction B, the latter performs a movement in this direction, however only so far until, as shown in FIG. 13, the cranked coupling lever 24 pivoted anti-clockwise by the displacement of the mass body 36 engages in the detent cam guide 18 fixed to the housing. More exactly speaking, as soon as the retaining portion 48 of the coupling lever 24 contacts the full surface of the holding portion 50 of the detent cam guide 18 serving as stop, the mass body 36 cannot move further in the direction B and is thus secured.

Otherwise the functioning of the second embodiment of the belt buckle corresponds to that of the first embodiment. Especially the retaining portion 48 and the holding portion 50 do not hinder, during normal pressing of the release button 22, the movement thereof in the direction A, i.e. the coupling lever 24 is not allowed to perform an anti-clockwise rotary motion.

LIST OF REFERENCE NUMERALS

10 Belt buckle
12 housing shell
14 housing shell
16 buckle housing
18 detent cam guide
20 compression springs
22 release button
24 coupling lever
26 pins
28 first free arm
30 second free arm
32 step
34 acceptance
36 mass body
38 pivot body
40 bearing pins
42 bearing openings
44 stop
46 counter-stop
48 retaining portion
50 holding portion

The invention claimed is:

1. A belt buckle (10) for a seat belt comprising
a buckle housing (16),
a locking mechanism for locking a plug-in tongue inserted in the buckle housing (16),
a release button (22) which is movable in a first direction A relative to the buckle housing (16) for unlocking the plug-in tongue, and
a safety mechanism for preventing automatic displacement of the release button (22) in the first direction A,
wherein the safety mechanism includes a mass body (36) movable in the first direction A relative to the buckle housing (16) and a rotatably supported coupling lever (24) having an axis of rotation C which is stationary relative to the buckle housing (16),
and wherein the coupling lever (24) is coupled to the mass body (36) and to the release button (22) so that upon acceleration of the belt buckle (10) in a second direction B opposed to the first direction A it transmits an inertia force acting on the mass body (36) in the first direction A to the release button (22) in the opposite second direction B,
wherein a latch mechanism which, upon acceleration of the belt buckle (10) in the first direction A, delimits a displacement of the mass body (36) in the second direction B due to the inertia force acting on the mass body (36) in the second direction B.

2. The belt buckle (10) according to claim 1, wherein the latch mechanism includes a pivot body (38) which is pivoted about an axis of rotation D on the mass body (36) and has a center of gravity which is eccentric with respect to its axis of rotation D.

3. The belt buckle (10) according to claim 2, wherein an inertia force acting on the pivot body (38) in the second direction B causes a deflection of the pivot body (38) by which a retaining portion (48) of the pivot body (38) engages in a holding portion (50) fixed to the buckle housing.

4. The belt buckle (10) according to claim 2, wherein the mass of the release button (22) is smaller than the sum of the masses of the mass body (36) and of the pivot body (38).

5. The belt buckle (10) according to claim 1, wherein the mass of the mass body (36) is larger than the mass of the release button (22).

6. The belt buckle (10) according to claim 1, wherein the latch mechanism is designed so that a movement of the mass body (36) in the second direction B causes a rotation of the coupling lever (24) which is delimited by a holding portion (50) fixed to the buckle housing.

7. The belt buckle (10) according to claim 1, wherein the coupling lever (24) includes two free arms (28, 30) extending from its axis of rotation C, wherein a first free arm (28) acts on the release button (22) and a second free arm (30) acts on the mass body (36).

8. The belt buckle (10) according to claim 7, wherein in a normal state of the belt buckle (10) in which the release button (22) is provided relative to the buckle housing (16) in a position extended in the second direction B, the first free arm (28) is adjacent in the second direction B to the release button (22), especially to a step (32), and is deflectable by displacement of the release button (22) in the first direction A.

9. The belt buckle (10) according to claim 8, wherein the second free arm (30) slides to the step (32) of the release button (22) when the coupling lever (24) is deflected.

10. The belt buckle (10) according to claim 1, wherein apart from the coupling lever (24), no further coupling exists between the release button (22) and the mass body (36).

11. The belt buckle (10) according to claim 1, wherein a displacement of the mass body (36) in the first direction A is delimited by a stop (44) fixed to the buckle housing which is preferably located in the trajectory of a counter-stop (46) of the mass body (36).

* * * * *